Aug. 25, 1931.   D. R. BOWEN   1,820,689
PRESSURE REGULATING DEVICE FOR ROLLER MILLS
Filed Feb. 6, 1926   3 Sheets-Sheet 1

Aug. 25, 1931.  D. R. BOWEN  1,820,689
PRESSURE REGULATING DEVICE FOR ROLLER MILLS
Filed Feb. 6, 1926  3 Sheets-Sheet 2
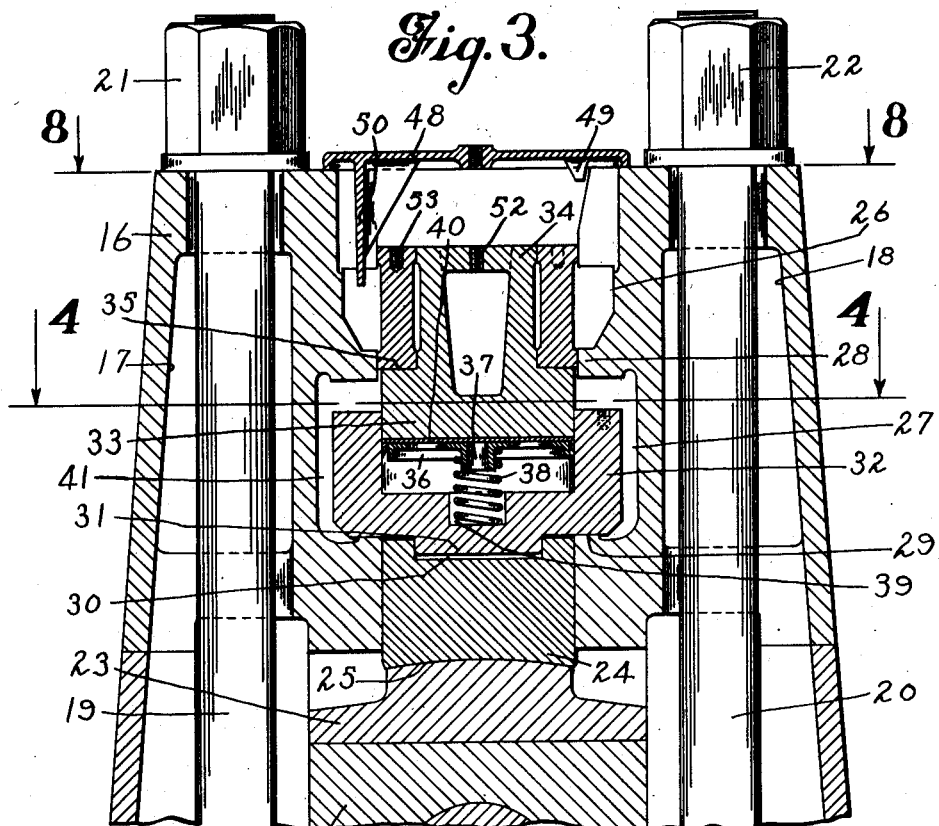
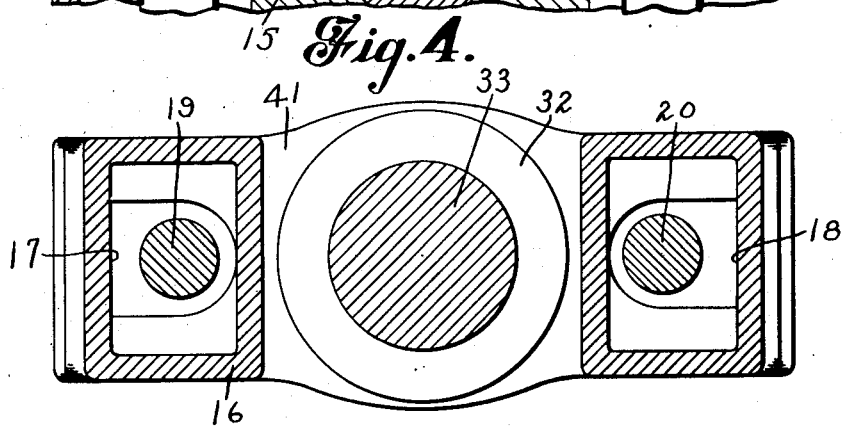
Inventor
David R. Bowen
By Henry E. Rockwell
Attorney Aug. 25, 1931.    D. R. BOWEN    1,820,689
PRESSURE REGULATING DEVICE FOR ROLLER MILLS
Filed Feb. 6, 1926    3 Sheets-Sheet 3
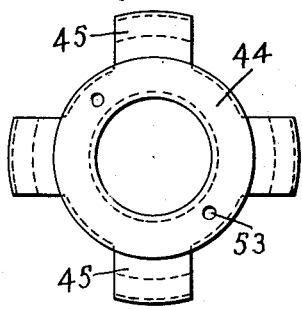
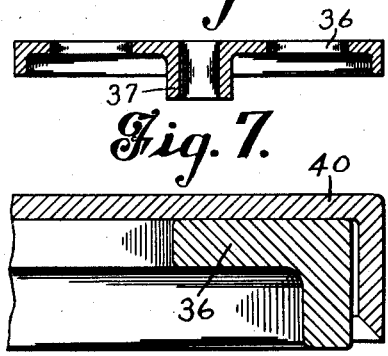
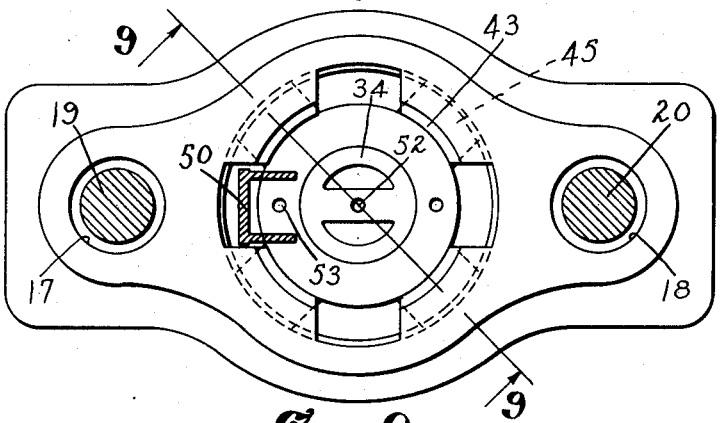
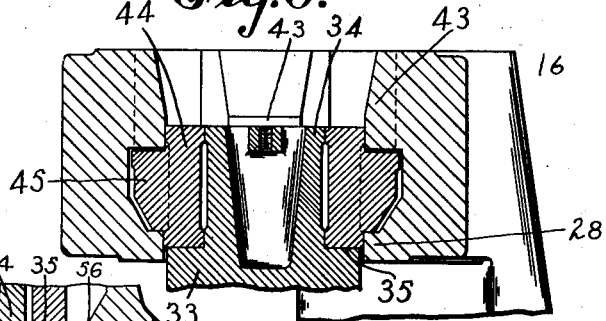
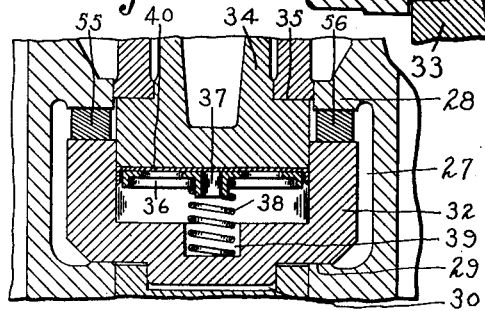
Inventor
David R. Bowen
By Henry E. Rockwell
Attorney Patented Aug. 25, 1931

1,820,689

UNITED STATES PATENT OFFICE

DAVID R. BOWEN, OF ANSONIA, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT

PRESSURE REGULATING DEVICE FOR ROLLER MILLS

Application filed February 6, 1926. Serial No. 86,609.

This invention relates to certain improvements in pressure regulating devices for roller mills and more particularly such mills as are used for grinding or crushing sugar cane and extracting the juice therefrom, although it will be understood that the application of my invention is not limited to this particular class of machines.

In grinding cane it is important that a uniform pressure be maintained by the rolls upon the material passing therethrough, regardless of the amount of this material, and irrespective of the variation in the distance between the opposing surfaces of the rolls caused by varying amounts of material. Therefore, it is customary to employ pressure regulating devices for the rolls which usually include a cylinder and ram such that a fluid such as water may be introduced between the cylinder head and ram to force the ram toward the roll bearing under a pressure of several hundred tons.

The loss of pressure from the cylinder is usually prevented by a suitable packing and as such packing frequently becomes worn, it is necessary to replace it. When such replacement is made, it is very undesirable to be compelled to suspend the operation of the mill for any considerable length of time, and hence it is extremely desirable to have the pressure regulating devices so constructed that the replacement may be made without tearing down the roll supports, and even without stopping the mill.

One object of the invention, therefore, is the provision of a hydraulic pressure device for roller mills such that the packing may be taken out and replaced by a new one without stopping the operation of the mill. The pressure device is of such construction that the parts of the device which it is necessary to remove for this purpose, may be expeditiously removed from and replaced in the roll support, while pressure is maintained upon the mills, and without breaking the hydraulic connection.

Another object of the invention is the provision of a hydraulic pressure regulator for mill rolls, comprising two members constituting a chamber in which fluid pressure may be introduced, one of these members being so arranged that it may be removed from its housing in the roll support without disturbing the other, with which the hydraulic connection is made, so that this connection need not be broken to gain access to the chamber.

A still further object of the invention is the provision of a cylinder and ram device for regulating the pressure upon the rollers of a roller mill and so mounting these devices in a roll support that one of the members may be removed through the top of the support and the other removed laterally through the side thereof.

A still further object of the invention is the provision of a hydraulic pressure device for roller mills comprising a cylinder and ram and so arranging these devices in the roll housing that the cylinder is arranged to operate on the roll bearing and at the same time may be removed laterally from the housing when desired.

To these and other ends the invention consists in the novel features and parts hereinafter described and claimed.

In the accompanying drawings:

Figure 3 is a sectional view through the top of the roll support on line 3—3 of Figure 2.

Figure 4 is a sectional view on line 4—4 of Figure 3.

Figure 5 is a top plan view of the bridge head employed to secure the ram in place.

Figure 6 is a sectional view of the packing plate.

Figure 7 is a fragmentary sectional view of the packing plate with the packing leather mounted therein.

Figure 8 is a sectional view on line 8—8 of Figure 3.

Figure 9 is a fragmentary sectional view on line 9—9 of Figure 8.

Figure 10 is a sectional view similar to Fig. 3, showing the method of blocking the cylinder when the ram is removed.

Figure 1:
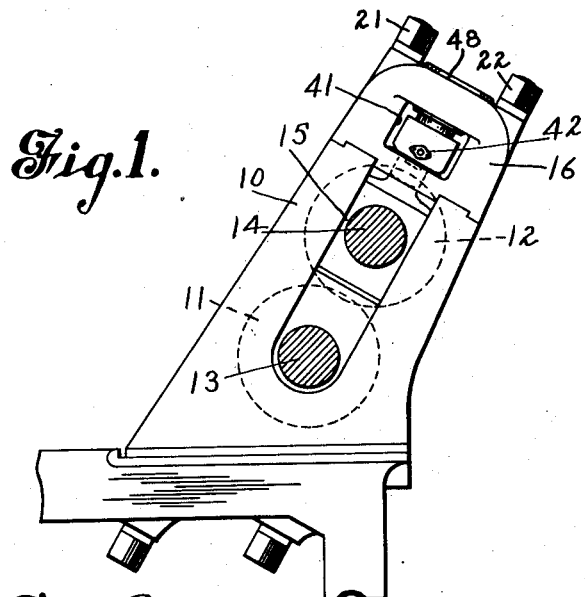
Figure 1 is a side elevational view of a two roller mill or cane crusher embodying my improvements.
Figure 2:
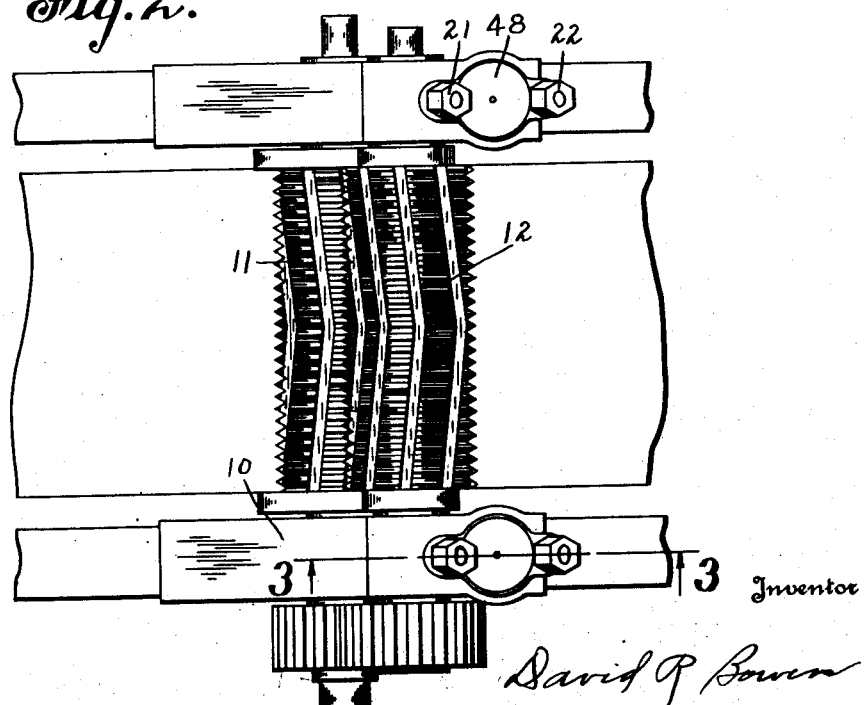
Figure 2 is a top plan view thereof.

With reference to the drawings which illustrate a preferred embodiment of my invention I have shown a roll support 10 in which are mounted a pair of rolls 11 and 12 having end journals 13 and 14, the journal 14 of the upper roll being mounted in a journal box 15, slidably mounted in the roll support 10. In the illustrated form of my invention I have shown at 16, a top cap for the roll support, the cap being hollow to provide a space for the hydraulic pressure regulating device to be hereinafter described and having end openings 17 and 18 through which are passed the ends of large bolts 19 and 20 to receive the nuts 21 and 22 to secure the cap in place. While the provision of such a removable cap 16 is in accordance with the present practice, it will be understood that my hydraulic pressure device may be removed while the cap is in place so that in some aspects of the invention it is not of importance whether or not the cap 16 is removable.

As shown in Figure 3 a pressure plate 23 is arranged to bear upon the upper side of the journal box 15 and a bearing block 24 bears in turn upon the upper side of the pressure plate. The lower surface of this block and the upper surface of the pressure plate are somewhat rounded as shown at 25 so as to insure a full contact between these parts while permitting a certain amount of variation or play in their relative positions.

As illustrated in the drawings the cap 16 is hollow so as to provide an upper chamber 26 and a lower chamber 27, the two being separated by an annular interior shoulder 28 in the bore of the cap. The lower chamber 27 terminates in a shoulder 29, the bearing block 24 extending upwardly through the bottom of the cap substantially to a point opposite this shoulder.

The block 24 is provided with a recess 30 in its upper surface within which rests a lug 31 on the lower side of a cylinder 32 mounted within the chamber 27 and arranged to be limited in its downward movement by the shoulder 29. Within the cylinder is a ram 33 provided with an enlarged head and a reduced neck 34 separated from the head by a shoulder 35. Within the cylinder is mounted a packing plate 36 and provided at its lower side with a guide stem 37 which fits within a spiral spring 38, the lower end of which is seated in a recess 39 in the bottom of the cylinder. A packing member 40 of leather or other suitable material is mounted on the top of the packing plate and as shown in Figure 7 extends over the side edge of the plate, to some extent, to make a tight joint between the ram and cylinder. It will be understood that these devices are subjected to an extremely high pressure, sometimes as great as 5,000 pounds per square inch and as a result the packing member must effectually close the space between the piston and the cylinder wall.

As shown in Figures 1, 3 and 4 the cap 16 is provided with a lateral opening 41 extending into the chamber 27, this opening being of such dimensions that the cylinder 32 may be removed from the roll support laterally through this opening. Upon one side of the cylinder a connection is made as at 42 for the admission of fluid pressure thereto.

Upon the walls of the upper chamber 26 of the cap are provided inwardly extending lugs 43, four of these being shown in the drawings, although the number may be varied as desired. A cylindrical bridge member 44 is provided to be inserted in the chamber 26 and embraces or surrounds the neck 34 of the ram, the lower face of this member seating upon the shoulder 35. This bridge member is provided with outwardly projecting lugs 45, preferably equal in number to the inwardly extending lugs 43 on the cap and so arranged that the bridge member may be inserted downwardly into the chamber 26, the lugs 45 passing within the spaces between the lugs 43. The bridge member may thereafter be turned substantially ⅛th of a complete revolution according to the modification illustrated so that lugs 45 will lie below the lugs 43 on the cap and hence prevent upward movement of the bridge member. This position of the parts is shown in Figures 8 and 9. As shown in the latter figure, the lugs 45 lie between the lower surfaces of the lugs 43 and the upper surface of the shoulder 23, this shoulder limiting the bridge member against further downward movement. It will be apparent that as the shoulder 35 on the ram contacts with the lower surface of the bridge member, the ram will in this manner be effectually held against upward movement and hence the effect of introducing fluid pressure into the cylinder is to tend to maintain the latter member in its lowermost position shown in Fig. 3.

A cover member 48 may be provided for the cap, this member being provided with lugs 49 to contact with the wall of the chamber 26 and correctly position the cover and also provided with a downwardly extending lug 50, shown more particularly in Figs. 3 and 8, which projects between two adjacent lugs 45 on the bridge member and prevents rotation of this member so that the lugs thereon will always be maintained in registration with the lugs 43 on the cap.

When removing the parts of my pressure regulating device, in order to replace the packing 40, blocks 55 and 56 are placed between the upper surface of the cylinder and the shoulder 28 to hold the cylinder in position to maintain pressure on the roll bearings. The hydraulic pressure is then shut off and the cylinder drained. The cover 48 is then removed from the cap and the bridge member rotated until its lugs are freed from those on the cap when it can be lifted out of the chamber 26. The ram 33 can then be lifted out at the top of the cap in the same way as the bridge member. To provide a convenient means for raising these elements which are relatively heavy in the case of large mills, threaded openings 52 and 53 are provided therein for the reception of eye-bolts by which they may be raised. The leather packing together with the packing plate is then accessible and may be removed and a new packing substituted for the old one and the parts replaced. All of these operations may be performed without stopping the mill, as the cylinder is blocked against upward movement and hence maintains pressure on the roll bearings. Likewise, as the cylinder is not removed, the hydraulic connection 42 need not be broken and thus a great saving in time and labor is effected.

The neck 34 of the ram, fitting within the bridge member, serves to guide the ram in its movements, and this function is particularly desirable where, as shown in Fig. 1, the roll supports are in an inclined position, and hence any movement of the ram occurs in a path at an inclination to the vertical.

While I have shown and described a preferred embodiment of my invention, it is understood that it is not to be limited to all the details shown, but is capable of modification and variation within the spirit of the invention and within the scope of the appended claims.

What I claim is:

1. In a roller mill, a roll support, rolls mounted in suitable bearings therein, a removable chambered cap for said support, and a hydraulic pressure device mounted in said cap comprising a cylinder operating on the roll bearing and a ram cooperating with the cylinder, the cap having a top opening communicating with the chamber, of less diameter than the cylinder, and said ram being removable through said opening, the walls of the cap overlying the cylinder and providing means for limiting the movement of the cylinder when the ram is removed.

2. In a roller mill, a roll support, rolls mounted in suitable bearings therein, a removable cap for said support, said cap having an interior chamber and a top opening communicating with said chamber, a cylinder mounted within the chamber and operating upon one of the roll bearings, a ram cooperating with the cylinder and being removable from the cap through said opening, said opening being of less diameter than said cylinder, whereby the walls of the cap adjacent the opening may overlie the cylinder to limit the movement of the cylinder when the ram is removed.

3. In a roller mill, a chambered roll support, rolls mounted in suitable bearings in said support, there being a shoulder at the lower end of said chamber, a cylinder mounted in said chamber above said shoulder and arranged to operate on one of the roll bearings, a ram cooperating with said cylinder, means for limiting the movement of the ram, means for introducing fluid pressure between the cylinder head and ram, and said support having an opening through which the ram is removable independently of the cylinder and means for holding said cylinder against the shoulder while the ram is removed.

4. In a roller mill, a chambered roll support, rolls mounted in suitable bearings in said support there being a shoulder at the lower end of said chamber, a cylinder movably mounted in said chamber above said shoulder and arranged to operate on one of the roll supports, a ram cooperating with said cylinder, means for limiting the movement of the ram, and means for introducing fluid pressure between the cylinder head and ram, the roll support having a top opening communicating with the chamber, and said ram being removable through said opening and means for holding said cylinder against the shoulder at the lower end of the chamber while the ram is removed.

5. In a roller mill, a roll support, a hollow cap therefor having a top opening, a pressure regulating device within the cap comprising a cylinder designed to operate on the roll bearing and a ram cooperating with the cylinder, said ram being removable from the cap through said opening, said support being provided with an opening and means adapted to be inserted through said opening to engage said cylinder and hold said cylinder in place when the ram is removed.

6. In a rolling mill, a roll support, rolls mounted in suitable bearings therein, a hydraulic pressure device removably mounted in said support, said device comprising relatively movable members between which fluid under pressure may be applied, one of said members normally being fixed with respect to said support and the other member being movably mounted in the support but having a fixed relation with respect to the roll bearing at all times, and means cooperating with the last named member to hold the latter against movement in the support when the first member is removed therefrom.

7. In a rolling mill, a roll support, rolls mounted in suitable bearings therein, a hydraulic pressure device removably mounted in said support, said device comprising relatively movable members between which fluid under pressure may be applied, one of said members normally being fixed with respect to said support and the other member being movably mounted in the support but having a fixed relation with respect to the roll bearing at all times, means detachably mounted on said support for holding said members in said support, both of said members being freely removable from the support upon detachment of said means, and means cooperating with the last named member to hold the latter against movement in the support when the first member is removed therefrom.

8. In a rolling mill, a roll support, rolls mounted in suitable bearings therein, a hydraulic pressure device removably mounted in said support, said device comprising a ram and cylinder, said ram being normally fixed against the movement with respect to said support, and said cylinder being movably mounted in the support but having a fixed relation with respect to the roll bearing at all times, and means cooperating with said cylinder to hold the latter against movement in the support when the ram is removed.

9. In a rolling mill, a roll support, rolls mounted in suitable bearings therein, a hydraulic pressure device removably mounted in said support, said device comprising a ram and cylinder, said ram being normally fixed against movement with respect to said support, and said cylinder being movably mounted in the support but having a fixed relation with respect to the roll bearing at all times, means detachably mounted on said support for holding said ram and cylinder in the support, said ram and cylinder being freely removable from the support upon detachment of said means, and means cooperating with said cylinder to hold the latter against movement in the support when the ram is removed.

10. In a rolling mill, a roll support, rolls mounted in suitable bearings therein, a hydraulic pressure device removably mounted in said support, said device comprising a ram and a cylinder, a follower mounted for reciprocation in said support immediately below said cylinder, said follower and cylinder being freely separable from one another, and means cooperating with the cylinder to hold the latter immovable in the roll support against upward pressure of the follower during the removal of the ram.

11. In a roller mill, a roll support, a chambered cap therefor having a shoulder at the lower ends of the chamber, rolls mounted upon suitable bearings in said support, a cylinder movable within the chamber and designed to engage said shoulder to limit its movement toward the rolls, a ram cooperating with said cylinder, means for transmitting said pressure from the cylinder to one of the roll bearings, and means for holding the cylinder in position against said shoulder to resist pressure on said bearing independently of the ram.

12. In a roller mill, a roll support, a chambered cap therefor, a cylinder movably mounted in said chamber and operating on the roll bearings, a ram mounted in the cap and cooperating with said cylinder, means for introducing fluid pressure between said cylinder head and ram, said cap having a lateral opening communicating with said chamber, and said cylinder being removable through said opening, said chamber opening through the top of the cap, and said ram being removable through said top opening, said top opening being of less diameter than said cylinder whereby the cap may cooperate with the cylinder to support the latter against the thrust of the rolls while the ram is removed.

13. In a roller mill, a roll support, a chambered cap therefor, rolls mounted on suitable bearings in said support, a pressure regulating device mounted within the chamber comprising a ram and cylinder, detachable means carried in the cap for limiting the upward movement of the ram, means for transmitting pressure from the cylinder to one of the roll bearings, said ram being adapted to be removed from said cap upon the detachment of said ram limiting means, and means for limiting the upward movement of the cylinder upon the ram being detached.

14. In a roller mill, a roll support, a chambered cap therefor, rolls mounted on suitable bearings in said support, a pressure regulating device mounted within the chamber comprising a ram and cylinder, detachable means for limiting upward movement of the ram, and means for transmitting pressure from the cylinder to one of the roll bearings, said cap having a lateral opening communicating with said chamber, said cylinder being removable through said opening, said ram being adapted to be removed from said cap upon the detachment of said ram limiting means.

15. In a roller mill, a roll support having a chamber at the top thereof, a pressure regulating device in said chamber comprising a ram and cylinder, said support being provided with top and side openings communicating with said chamber, one of said members being removable through one opening only and the other of said members being removable through the other opening only, and means for holding one of said members in operative position against the thrust of the rolls while the other member is removed.

16. In a roller mill, a roll support having a chamber at its upper portion, means for regulating pressure on the roll bearings comprising a cylinder mounted in said chamber for movement toward and from the rolls, said support being provided with a laterally projecting shoulder above said cylinder, and means for limiting movement of the cylinder toward said shoulder.

17. In a roller mill, a roll support, means for regulating pressure on the roll bearings comprising a reciprocable cylinder and a piston mounted in said support, said piston having an outwardly projecting neck and a guide member mounted in the support and surrounding said neck.

18. In a roller mill, a roll support, means for regulating pressure on the roll bearings comprising a reciprocable cylinder and a piston mounted in said support, said piston having an outwardly projecting neck and a guide member mounted in the support and surrounding said neck, and said guide member limiting outward movement of the piston.

19. In a roller mill, a chambered roll support, means for regulating pressure on the roll bearings comprising a cylinder and piston mounted in said support, said piston having an outwardly projecting neck and a guide member mounted in the support and surrounding said neck, said guide member limiting outward movement of the piston, and means to retain said guide member in place comprising cooperating lugs on said member and on the roll support.

20. In a roller mill, a chambered roll support, means for regulating pressure on the roll bearings comprising a piston and cylinder mounted in the support, said piston having an outwardly projecting reduced neck portion and a shoulder at the lower end of said neck portion, and a member demountably secured in the roll support and engaging said shoulder to limit outward movement of the piston.

21. In a roller mill, a chambered roll support, means for regulating pressure on the roll bearings comprising an outwardly facing cylinder, the inner closed end of which is arranged to exert pressure on the roll bearings, a piston mounted in the open end of the cylinder, and a stop member removably mounted in the roll support and engaging said piston to limit outward movement thereof.

22. In a roller mill, a chambered roll support, means for regulating pressure on the roll bearings comprising an outwardly facing cylinder, the inner closed end of which is arranged to exert pressure on the roll bearings, a piston mounted in the open end of the cylinder, and a stop member removably mounted in the roll support and engaging said piston to limit outward movement thereof, said stop member being inserted into the roll support by a longitudinal thrust and locked therein by a rotary motion, and means to thereafter retain said member against movement.

23. In a roller mill, a chambered roll support, means for regulating pressure on the roll bearings comprising an outwardly facing cylinder, the inner closed end of which is arranged to exert pressure on the roll bearings, a piston mounted in the open end of the cylinder, and a stop member removably mounted in the roll support and engaging said piston to limit outward movement thereof, said stop member being inserted into the roll support by a longitudinal thrust and locked therein by a rotary motion, and means to thereafter retain said member against movement, said means including a cover cap for the chamber of the roll support and a lug thereon projecting into the path of movement of said member.

24. In a roller mill, a roll support, rolls mounted on suitable bearings in said support, a pressure actuated device in said support capable of movement towards and away from one of said roll bearings, means for transmitting pressure from said device to said roll bearing, and means adapted to be interposed between said device and said support for locking said device against movement.

25. In a roller mill, a roll support, rolls mounted on suitable bearings in said support, a pressure actuated device in said support capable of movement towards and away from one of said roll bearings, stops limiting the movement of said device, means for transmitting pressure from said device to said roll bearings, and means adapted to be interposed between said device and said support for locking said device against one of its stops.

In witness whereof, I have hereunto set my hand this 5th day of February, 1926.

DAVID R. BOWEN.